Jan. 12, 1965      J. D. LANGDON      3,165,096

COMPRESSION BRAKE FOR MOTOR VEHICLES

Filed April 9, 1962

J.D. Langdon
INVENTOR.

United States Patent Office 3,165,096
Patented Jan. 12, 1965

3,165,096
COMPRESSION BRAKE FOR MOTOR VEHICLES
Jesse D. Langdon, 1 John St., East Rockaway, N.Y.
Filed Apr. 9, 1962, Ser. No. 186,230
5 Claims. (Cl. 123—97)

This invention relates to motor vehicle brakes and provides means to safely stop the motor vehicle in case of failure of conventional brake equipment.

The primary purpose of the invention is to utilize the compression pressure capacity of a piston driven internal combustion engine to build up air pressure in the compression chamber of the engine of a motor vehicle and thereby resist movement of piston means reciprocating within engine cylinder means, effective to stop the vehicle at such times as the crankshaft of the engine is interconnected with the drive wheels of the vehicle.

One object of the invention is to provide means for deactivating the fuel supply source of the engine to prevent intake of motivating fuel into the engine, and at the same time provide air intake means permitting free entry of air in place of carbureted or other fuel into the motor vehicle engine.

Another object is to convert the vehicle engine into an air compressing device motivated by the driving wheels of the vehicle, by providing valve means for closing the exhaust passage means of the engine, thereby prohibiting the exhaust of compresed air and utilizing maximum pressure built up in the compression chamber of the engine to resist movement of the piston means reciprocating in the engine cylinder means.

Other and further objects and purposes of the invention will appear during progress of the specification, as illustrated by the drawing. The drawing shows one species form of reduction to practice and is diagrammatic as related to other species involved by the invention. The only limitation of the invention is set forth by the claims: and reduction to practice is not limited to the species form of the invention illustrated and may be changed within scope of allowed claims.

Figure 1:
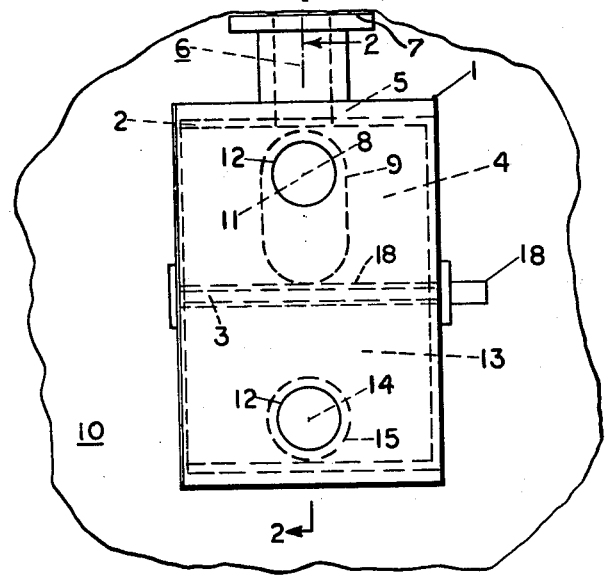
FIG. 1 is an elevation of the device constituting the invention looking toward internal combustion engine 10 and showing hidden features in dotted lines.

The numerals constituting characters indicating all passages shown by both figures of the drawing are labeled as follows: 5 elongated port for matching fuel inlet passage 6 disposed thru tubular mount 7. Engine intake passage formed by engine inlet port 8 leading and communicating from inlet tube 9 registering with port 5. Fragmentary portion of engine 10 being connected to inlet tube 9. Passage thru inlet tube 12 is extended thru the wall of cylindrical casing 1. Passage thru outlet tube or engine exhaust tube 15 provides a passage leading from engine 10 thru wall of cylindrical casing 1. Exhaust outlet tube 17 provides a passage extended thru and leading from the wall of cylindrical casing 1.

The figures of the drawing illustrate the invention with the elements thereof set in braking position and comprise a cylindrical casing 1, provided with an open and closed end. A hollow cylindrical sleeve 2 provided with a closed outer end, the opposite end being snugly inserted for rotation inside cylindrical casing 1 and resting against the inside of the closed end of the cylindrical casing 1. The hollow of sleeve 2 is provided with longitudinal partition 3 dividing said hollow into intake chamber 4 and exhaust chamber 13. The intake chamber 4 is located on one side of partition 3 and is provided with an elongated port 5 disposed thru the wall of sleeve 2 for communicating with inlet passage 6 thru the wall of sleeve 2 for communicating with inlet passage 6 thru a tube forming a mount 7 providing attaching means for a source of fuel supply not shown. The position of an internal cobustion engine intake port is indicated by numeral 8 and registers with the upper end portion of elongated port 5 and passage of intake tube 9 provided for attachment to engine 10. Passage 6 is closed by wall portion of sleeve 2 forming valve means 19. Tubular air inlet 11 is shown as registering with a passage provided thru tubular extension 12 same projecting from outside casing 1 and being in axial alignment with engine port 8 and intake tube 9. Elongated port 5 registers with intake tube 9 at all times. Exhaust chamber 13 is located on that side of partition 3 that is opposite intake chamber 4 and is provided with exhaust port 14 for registering with a passage thru an exhaust tube 15 provided for attachment to an internal combustion engine exhaust port as at 15. An exhaust port 16 is provided thru the wall of exhaust chamber 13 for communication with passage of an exhaust outlet tube 17 projecting from the outside wall of casing 1, said outlet tube 17 being axially aligned with exhaust tube 15. Respective wall portions of sleeve 2 are shown to form valve means 19 for closing passage 9, valve means 20 for closing exhaust tube 15 and valve means 21 for closing outlet tube 17. Shaft means 18 is journaled for rotation thru closed end of casing 1 and is axially secured to the outer closed end of sleeve 2 to provide means for rotating sleeve 2 from braking position to normal engine operating position or vice versa.

For purpose of clarity and brevity of terminology suitable for claiming the invention per se, some of the various means and elements recited supra as comprising the invention are reidentified and changed as follows:

"Longitudinal partition 3," is termed, partitioned longitudinally. "Intake chamber," is termed, intermediate chamber. "Inlet passage 6" plus "mount 7" is termed, inlet means for compressible fluid mixture. "Engine intake port 8" plus "intake tube 9" is termed passage means communicating with a source of negative pressure. "Air inlet 11" plus "tubular extension 12" is termed, air inlet means. "Engine exhaust tube 15" is termed, pressure exhaust means "Shaft means 18," is termed, manual controlled means. The term pressure supplements "exhaust" when appropriate.

Shaft 18 is provided concomitant with partition 3 and sleeve 2 whereby the sleeve is rotated; shaft 18 being provided to permit attachment to any suitable operating means devised according to exigencies arising from varied arrangement of motor vehicle elements inherent in different models of motor vehicles.

Figure 2:
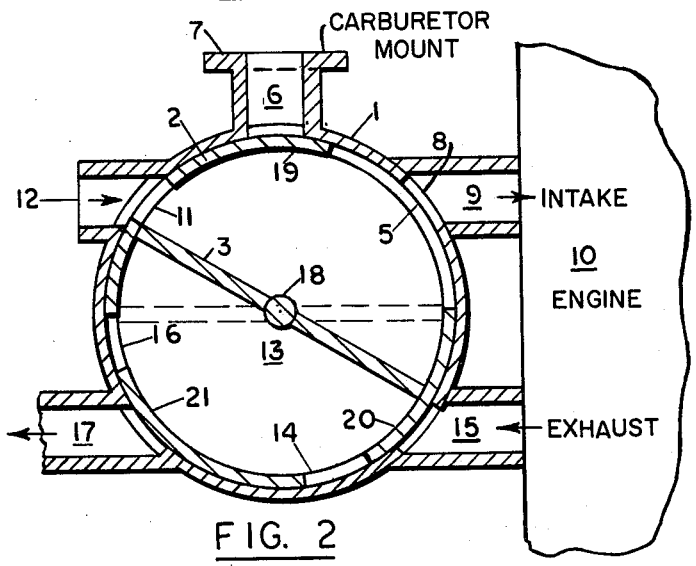
FIG. 2 is a vertical median sectional end view and is taken thru 2—2 of FIG. 1 looking endwise from the right.

Operation of the device utilizing reduction to practice illustrated by FIG. 2 to implement the braking effect of the device:

When sleeve 2 is rotated clockwise from normal position, the imperforate wall portion 19 providing valve means normally closing air inlet port 12, is moved to close carburetor mount passage means 6 to preclude intake of fuel, open air inlet passage means 11–12, and move imperforate wall portion forming valve means 20 closing exhaust tube 15 simultaneously with exhaust outlet passage 17 closed by valve means formed by imperforate wall 21 of sleeve 2, whereby air entering thru air inlet means 11–12 via chamber 4, port 8 and passage 9 into cylinder of engine 10, due to suction stroke of the piston means of the engine, is compressed in compression chamber of engine 10, building up pressure therein against the piston head according to compression ratio of the engine.

When in braking position as shown by FIG. 2, no air is permitted to exhaust thru tube 15, chamber 13 and exhaust outlet 17, thereby bringing the motor vehicle quickly to a stop, as full compression will be contained in compression chamber means at end of each compression stroke, regardless of cycle arrangement of the engine.

The invention lies in the illustrated arrangement of valve and port means and means to open and close said port means in connection with any piston type of internal combustion engine including auxiliary valve means 19 for closing port 6, valve means 20 for closing port 15 and valve means 21 all constituted by imperforate wall portions of sleeve 2 simultaneously closing respective ports 6, 15 and 17 at the same time that port 11 of sleeve 2 registers with the passage of inlet tube 12 and port 5 being registered with the passage of intake tube 9 and port 8, this arrangement being effective to prevent exhaust of air pressure thru engine exhaust tube 15 from a compression chamber provided for any engine to which the invention may be attached. The valve means 19 being provided to close fuel intake means 5-6 against communicating with chamber 4 to prevent entry of fuel into cylinder means of engine 10 via port 8 and passage of exhaust tube 9 and thereby preclude ignition of fuel in chamber 4 and cylinder means of engine 10 eliminating any fire hazard, due to a fuel mixture being projected thru passage means 5-6.

It is anticipated that direct, manually or solenoid controlled valves can be arranged to operate a device of the character described by the specification, it being obvious the valve arrangement claimed can include installation of separate valve units for conventional intake and exhust means of an internal combustion engine.

In case this invention is used with a Diesel type engine, regular air intake provided for engine will, by providing valve means closing the fuel passage, serve to permit air alone to enter engine without intake of fuel.

Having described the invention, operation and functions thereof, the following claims are made:

I claim:

1. A device of the character described comprising an article of manufacture including a cylindrical casing having a closed end and an oppositely disposed open end, a hollow cylindrical enclosed sleeve inserted into the open end of the casing for rotation therein, said casing provided with inlet means projecting outwardly of said casing to permit passage of compressible fluid mixture, air inlet means spaced laterally of said inlet means for fluid mixture and projecting outwardly of said casing exhaust passage means spaced away from the side of the fluid mixture inlet that is away from said air inlet means and disposed thru and projecting outwardly of said casing for communicating with a source of negative pressure, exhaust outlet means for communicating with atmosphere, same disposed thru said cylindrical wall of said casing and projecting outwardly thereof and spaced laterally away from the side of said air inlet means that is away from said fluid mixture inlet means, said exhaust outlet means located intermediate of said air inlet means and said exhaust passage means, the cylindrical hollow of said sleeve being partitioned longitudinally to form an intermediate intake chamber provided with an elongated port disposed thru the wall thereof for communicating at one and the same time between said inlet means for compressible fluid mixture and said passage means communicating with source of negative pressure, said air inlet means communicating between the intake chamber and atmosphere, an intermediate exhaust chamber being formed on that side of the partition opposite to said intake chamber, same provided with port means thru its cylindrical wall and communicating with said exhaust passage means, another port thru the wall of the exhaust chamber for communicating with said exhaust outlet means, cylindrical wall means of respective chambers extended between respective port means of each chamber and providing valve means for closing and opening respective passage means thru said casing, axially disposed shaft means providing manual central means to rotate said sleeve, said shaft means being axially journaled thru said closed end of said casing.

2. A device of the character described comprising a cylindrical casing, provided with an open and closed end, a hollow cylindrical sleeve provided with a closed outer end its opposite end being snugly inserted for rotation inside the casing and resting against the inside of the closed end of said casing, the hollow of the sleeve provided with a longitudinal partition dividing said hollow into an intake chamber and exhaust chamber, said intake chamber provided with an elongated port disposed thru the wall of said sleeve for communicating with an inlet passage of a tube forming a mount providing attaching means for a source of fuel supply, said elongated port provided for communication with an internal combustion engine intake a wall portion of said intake chamber forming valve means arranged to close said inlet passage, said elongated port registering at all times with the intake port of an internal combustion engine, an air inlet port thru the wall of said air inlet chamber registering with a tubular extension projecting from the outside of said casing and being in axial alignment with the intake port of of said internal combustion engine attached thereto, an exhaust chamber located on that side of said partition opposite to said intake chamber said exhaust chamber provided with an exhaust port thru its cylindrical wall arranged to register with a passage thru an exhaust tube provided for attachment to an internal combustion engine, an exhaust port provided thru the wall of said exhaust chamber for communication with the passage of an exhaust tube projecting from the outside wall of said casing, said exhaust outlet tube being axially aligned with said exhaust tube, respective wall portions of said sleeve forming valve means for closing said inlet passage of the mount, valve mean for closing said exhaust tube and valve means for closing said outlet tube, shaft means being journaled for rotation thru said closed end of said casing, said shaft means axially secured to its outer closed end of said sleeve to provide manual means for rotating said sleeve for opening and closing the described ports and passages accordingly.

3. A device of the character described adapted for connection to the intake and exhaust ports of an internal combustion engine comprising a cylindrical casing provided with tubular means for attachment to communicate with the pressure chamber of an internal combustion engine, said casing having a cylindrical sleeve with a closed outer end inserted into an open end provided for said casing, said sleeve being longitudinally divided into two chambers including an intake chamber having port means normally aligned with fuel intake passage means thru wall of said casing, an elongated port disposed thru the wall of said intake chamber and communicating at all times with the intake port of an engine, an air inlet passage disposed thru wall of said casing and being normally closed by valve means formed by an imperforate portion of the cylindrical wall of the sleeve, port means provided thru the wall of said sleeve arranged to coincide with said air inlet passage and being normally closed by the cylinder wall, an exhaust chamber being formed on the opposite side of a longitudinal partition separating the two chambers, said exhaust chamber provided with port means thru the wall of said exhaust chamber normally coinciding with an exhaust passage provided thru the wall of said casing for communicating with the engine intake port, the wall of the sleeve forming valve means adjacent the exhaust passage means when said sleeve is rotated, whereby said air inlet passage being open said fuel intake passage being closed, exhaust passage mean being closed for containing air pressure in the compression chamber of an internal combustion engine to which the described device is attached, creates resistance against movement of any piston according to the compression ratio of such engine.

4. A device of the character described comprising a cylindrical casing having a closed end and an oppositely disposed open end, the wall of said casing provided with fuel inlet means, air inlet means, outlet means, exhaust inlet means and exhaust outlet means, spaced away from one another, disposed thru and projecting outwardly of the casing wall, a hollow cylindrical sleeve having a closed outer end, its opposite end inserted into and rotatable within said casing, the hollow of said sleeve divided into an intake chamber and an exhaust chamber by a median partition disposed lengthwise of the cylindrical hollow of the sleeve, the wall of said intake chamber provided with elongated port means for simultaneously registering with said fuel inlet means and said outlet means of said casing when said sleeve is adjusted in normal operative relationship to said casing, an air inlet port provided thru the wall of said intake chamber and arranged to register with said air inlet means of said casing, said air inlet port normally closed by the wall of said casing, a wall portion of said intake chamber providing valve means for closing said fuel inlet means of said casing against ingress of fuel into said intake chamber when said sleeve is rotated, simultaneously registering said inlet port of said intake chamber with said inlet means of said casing, an exhaust inlet port provided thru the wall of said exhaust chamber and normally registering with said exhaust inlet means of said casing, an imperforate wall portion of said exhaust chamber providing valve means for closing said exhaust inlet means of said casing, an exhaust outlet port disposed thru the wall of said exhaust chamber and normally registering with said exhaust outlet means of said casing, an imperforate wall portion of said exhaust chamber providing valve means for closing said exhaust outlet means of said casing against egress of any pressure element from said exhaust chamber, shaft means axially secured to the closed end of said sleeve and journaled thru the closed end of said casing and providing means for rotating said sleeve, whereby said sleeve is rotated for changing relative position of said sleeve with respect to said casing.

5. An article of manufacture comprising a cylindrical outer casing, having an open end and an opposite closed end provided with oppositely disposed first and second axially aligned intake passages projecting laterally of and thru the upper wall portion of the outer casing, a third intake passage projecting upwardly thru the casing wall between said first and second intake passages, first and second axially aligned, oppositely disposed outlet passages projecting laterally thru the bottom portion of said casing wall, a hollow enclosed sleeve inserted thru the open end of and for rotation within the casing, a closed end of the sleeve closing the open end of said casing, a longitudinal partition dividing the hollow of said sleeve into an intake chamber and an outlet chamber, an elongated port disposed thru the intake chamber wall adjacent one end of the partition and registering with the first intake passage at all times, a second intake port disposed thru said intake chamber wall for registering with the second intake passage, a portion of said chamber wall forming intake valve means extended between said elongated port and said second port disposed thru said intake chamber wall, said intake valve means adapted to alternately open and close said second and third intake passages disposed thru the casing wall in accordance with rotation of said sleeve, the outlet chamber provided with first and second outlet port means disposed thru the wall thereof for registering with said first and second outlet passages disposed thru the bottom portion of said casing wall, first valve outlet means formed by a portion of the outlet chamber wall contiguous with that side of one end of said partition that is toward the first outlet passage, said first outlet means arranged to close the first outlet passage, second outlet valve means formed by a wall portion of said outlet chamber and extended between said first and second outlet ports, said second outlet valve means arranged to close the second outlet port at one and the same time as said first outlet port is closed by said first outlet valve means in accordance with rotation of said sleeve.

References Cited in the file of this patent

UNITED STATES PATENTS

| | | |
|---|---|---|
| 596,121 | Pattison | Dec. 28, 1897 |
| 1,247,930 | Campbell | Nov. 27, 1917 |
| 1,673,103 | Cochin | June 12, 1928 |
| 2,124,081 | Rauen et al. | July 19, 1938 |
| 2,440,336 | Hill | Apr. 27, 1948 |

FOREIGN PATENTS

| | | |
|---|---|---|
| 415,462 | France | July 13, 1910 |